Patented July 19, 1927.

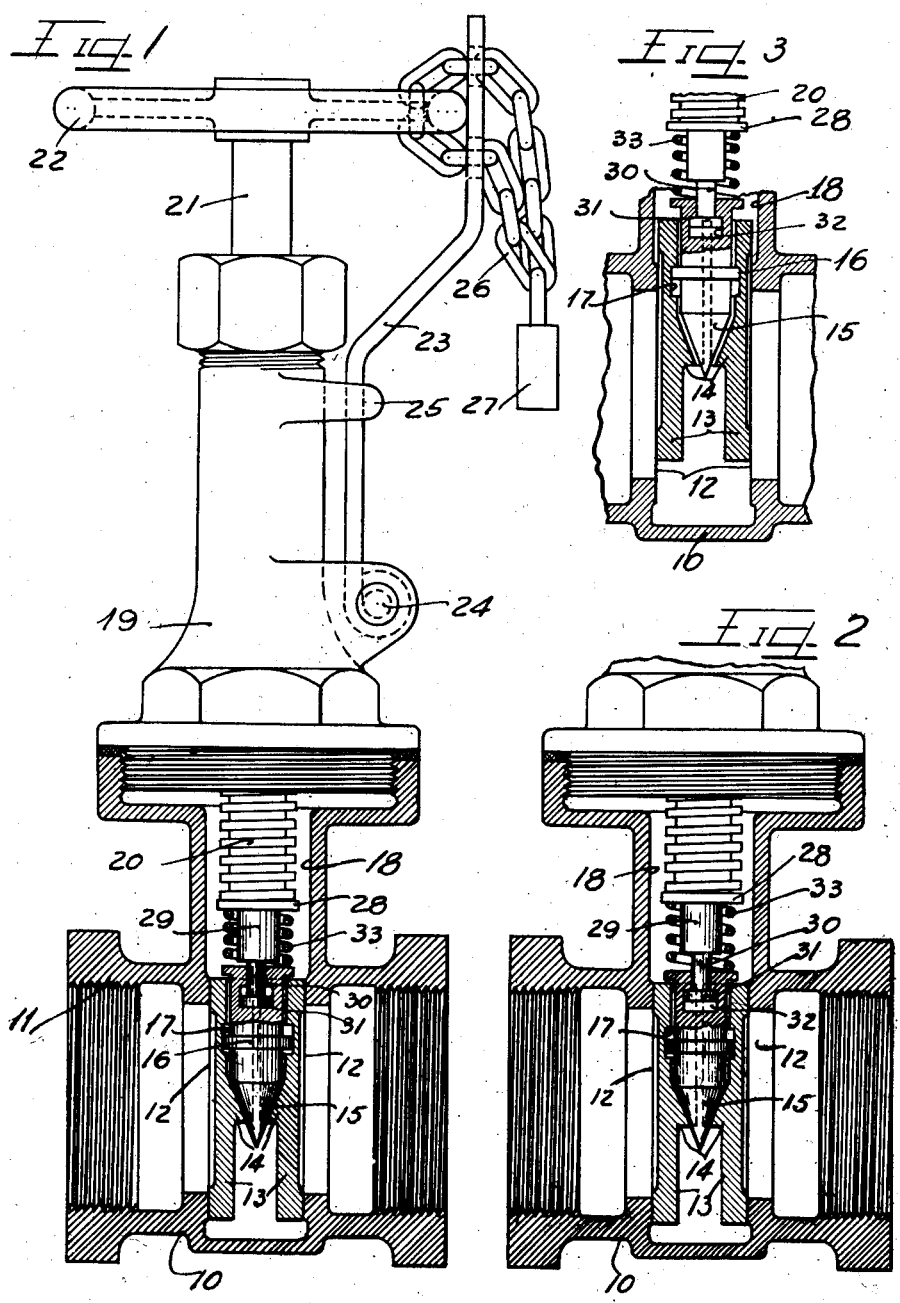

1,636,427

UNITED STATES PATENT OFFICE.

ANDREW M. MORRISON, OF DUBUQUE, IOWA.

GATE VALVE.

Application filed December 10, 1923. Serial No. 679,582.

This invention relates broadly to fluid valves wherein it is desirable to provide a delayed action of the actual opening of said valve while the operating mechanism is given its initial movement.

It is an object of this invention to provide a locking valve wherein a resilient lost motion is provided in the valve operating mechanism adapted to retain the valve in a fully sealed condition even though the operating mechanism is not positioned to positively hold the valve sealed.

It is also an object of this invention to provide a double gate valve wherein the separate gates are loosely hung from the operating mechanism and slightly spread thereby when the mechanism is moved to close the valve.

It is a further object of this invention to permit partial retraction of the operating mechanism after the valve has been closed without the possibility of the valve closure becoming unseated and allowing a seepage of liquid therethrough.

It is another object of this invention to provide a double gate valve wherein the separate gates are forced against their seats by a wedge contacting central bosses on the gates, whereby the gates are given a uniform pressure at all points of contact with their seats.

It is still another object of this invention to provide a double gate valve wherein the separate gates are free to individually align themselves with their seats.

Other and further important objects of this invention will be apparent from the disclosures in the specification and the accompanying drawings.

This invention (in a preferred form) is illustrated in the drawings and hereinafter more fully described.

As shown on the drawings:

Figure 1 is a partial section of a gate valve embodying features of this invention wherein the entire lost motion of the operating mechanism has been taken up.

Figure 2 is a fragmentary section similar to Figure 1 showing the lost motion mechanism fully extended at the time the valve wedge would begin to be retracted by a continued movement of the valve stem.

Figure 3 is a fragmentary section corresponding to Figures 1 and 2 with the valve closure partly open.

As shown on the drawings:

A valve body 10 is shown of the so called "gate" type wherein inlet and outlet pipe threads are represented at 11 and oppositely disposed valve seats are shown at 12. These valve seats are parallel but may be inclined if so desired to give a wedging action to valve discs 13 which as shown are made as separate and duplicate closures for each seat. These valve discs are provided with a central boss 14 formed to engage either a wedge or cone pointed member 15 having a collar 16 which engages in slots 17 in the valve discs, the slots being about twice the width of the collar so that when starting to retract the discs into a pocket 18 provided therefor in the valve body, the wedge member 15 is disengaged from the bosses 14 before the collar 16 engages the upper surface of the slots 17 to lift the valve discs. This allows the valve discs to separate from their seats and permits smooth and nearly frictionless withdrawal thereof into the pocket. By constructing these discs as separate units for each valve seat they are rendered self aligning and if desired the valve seats need not be parallel but may be made with a diverging angle.

The valve operating mechanism comprises a valve bonnet 19 screwed onto the valve body and containing threads (not shown) to engage threads 20 on a valve stem 21 for advancing said stem. The stem is provided with the usual operating wheel 22. A hinged locking bar 23 is pivoted to the bonnet at 24 and guided at 25. This bar 23 has suitable apertures to receive a chain 26 passed through the operating wheel 22 and locked by a padlock 27. There is necessarily considerable play in such a chain even if it is drawn up as tightly as possible, and moreover a spoke of the wheel 22 may be in a position to interfere with the chain when the valve is entirely closed. Under such circumstances the valve stem and wheel must be backed off slightly to permit locking the chain.

The threaded portion of the valve stem 21 terminates in a shoulder 28 below which is a cylindrical section 29 serving as a spring guide. Below the guide a narrow shank 30 carries a head 31 which fits into a T slot 32 in the top of the wedge (15) with sufficient up and down lost motion to provide approximately a half turn or more of the valve stem between the extreme movements of the head 31 in the T slot. A coiled spring 33 surrounds the spring guide and one end thereof bears against the shoulder 28, while the other end bears against the wedge to hold the latter at its extreme position relative to the head 31. It is to be understood that if a solid wedge-shaped gate is used with diverging valve seats, the shank 30 and head 31 engage in a similar T slot in the gate itself as the wedge member (15) is therefore unnecessary.

The operation of this valve is as follows. Assume that the valve is in the position of Figure 3 and is being closed. Rotation of the valve stem lowers the valve discs until they come to rest without pressure against the valve seat. Further rotation of the valve stem brings the cone point of the wedge member 15 against the central bosses 14 on the valve discs, the spring 33 serving to hold the wedge extended as shown in Figure 2. Still further rotation of the valve stem compresses the spring 33 until the head 31 comes into contact with the bottom of the T slot 32 as in Figure 1 whereupon any desired pressure may be positively applied to the valve discs to assure a positive closure. Such pressure on the central bosses 14 is of course uniformly distributed over the valve seat faces. The spring 33 is purposely made sufficiently stiff to maintain the wedge and valve discs in position against any fluid pressure the valve is designed for, so that after forcing the valves to a seat the valve stem may be retracted to an extent limited only to the play or lost motion between the head 31 and T slot 32. Thus for example if the valve stem wheel is locked with a chain when the head 31 presses on the member 15, all the slack ordinarily found in such a chain and padlock can be taken up by a reverse rotation of the wheel without loosening the valve discs and thereby permitting seepage of liquids through the valve.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a gate valve, a body, a valve stem, a wedge having a lost motion connection to said valve stem, a spring surrounding said stem adapted to normally move the wedge to the limit of its lost motion connection, and valve discs, said wedge and the inner faces of said valve disks having directly engaging means supporting the disks on the wedge and providing for limited relative movement of the wedge with respect to the disks.

2. A valve including a pair of valve disks, a valve stem, a valve actuating member in a single piece between the disks, having means at its lower end engaging the disks centrally of their adjacent faces to shift the same laterally, a lost motion connection between the upper end of said actuating member and the stem, means to normally maintain said actuating member in extended position on the stem, and an outstanding part on the actuating member to engage the adjacent faces of the disks for raising the latter, said disks having recesses in their said inner faces in which the outstanding part of the actuating member movably seats.

3. A valve including a pair of valve disks having bosses centrally of their inner faces, a valve stem, a cylindrical valve actuating member in a single piece between the disks having a conical lower end engaging and cooperating with said bosses of the disks, said actuating member having a socket in its upper end in which the lower end of the valve stem is rotatable and has a limited longitudinal movement, a spring associated with the valve stem and engaging said actuating member to normally hold the same in extended position on the valve stem, an outstanding rib on the actuating member intermediate its ends, said valve disks having recesses in portions of their inner faces into which recesses the rib of the actuating member extends and is movable.

In testimony whereof I have hereunto subscribed my name.

ANDREW M. MORRISON.